(12) United States Patent
Gordin et al.

(10) Patent No.: US 12,478,004 B2
(45) Date of Patent: Nov. 25, 2025

(54) APPARATUS, METHOD, AND SYSTEM FOR IMPROVED TURF OR GRASS GROWTH

(71) Applicant: Musco Corporation, Oskaloosa, IA (US)

(72) Inventors: Myron Gordin, Oskaloosa, IA (US); Bradley D. Schlesselman, Oskaloosa, IA (US)

(*) Notice: Subject to any disclaimer, the term of this patent is extended or adjusted under 35 U.S.C. 154(b) by 0 days.

(21) Appl. No.: 18/944,135

(22) Filed: Nov. 12, 2024

(65) Prior Publication Data

US 2025/0063997 A1    Feb. 27, 2025

Related U.S. Application Data

(62) Division of application No. 17/985,244, filed on Nov. 11, 2022, now abandoned.

(60) Provisional application No. 63/287,115, filed on Dec. 8, 2021.

(51) Int. Cl.
| | | |
|---|---|---|
| *A01G 20/30* | (2018.01) | |
| *A01G 7/02* | (2006.01) | |
| *A01G 7/04* | (2006.01) | |
| *A01G 25/09* | (2006.01) | |

(52) U.S. Cl.
CPC ............ *A01G 20/30* (2018.02); *A01G 7/02* (2013.01); *A01G 7/045* (2013.01); *A01G 25/09* (2013.01)

(58) Field of Classification Search
CPC .......... A01G 20/30; A01G 7/02; A01G 7/045; A01G 25/09
See application file for complete search history.

(56) References Cited

U.S. PATENT DOCUMENTS

| | | | |
|---|---|---|---|
| 8,138,690 B2 | 3/2012 | Chemel et al. | |
| 8,297,782 B2 | 10/2012 | Bafetti et al. | |
| 8,604,700 B2 | 12/2013 | Waumans et al. | |
| 8,911,664 B1* | 12/2014 | Cavanaugh | A01D 34/001 422/1 |
| 9,161,497 B2* | 10/2015 | Tseng | A01G 9/18 |
| 9,307,703 B2 | 4/2016 | Berghoff et al. | |
| 9,603,300 B2* | 3/2017 | Pettersson | G05D 1/0246 |
| 10,111,392 B2* | 10/2018 | Szeto | A01M 29/10 |
| 10,191,488 B2* | 1/2019 | Franzius | G05D 1/0088 |
| 10,244,675 B2* | 4/2019 | LaRowe | A01M 31/002 |

(Continued)

FOREIGN PATENT DOCUMENTS

| | | | |
|---|---|---|---|
| CA | 3047422 A1 | 6/2017 | |
| CA | 3115757 A1 * | 4/2020 | A01G 7/045 |

(Continued)

OTHER PUBLICATIONS

Translation of DE202019106971 (Year: 2020).*

(Continued)

*Primary Examiner* — Monica L Perry
*Assistant Examiner* — Aaron M Rodziwicz
(74) *Attorney, Agent, or Firm* — Kurt J. Fugman

(57) ABSTRACT

A method of growing grass or turf of varying types includes determining lighting needs of a sward, measuring or otherwise determining an existing DLI and spectrum of light delivered to the sward, and delivering supplemental lighting to at least a portion of the sward dependent, at least in part, on determining the lighting needs of the sward and measuring or otherwise determining the existing DLI and spectrum of light delivered to the sward.

8 Claims, 7 Drawing Sheets

(56) References Cited

U.S. PATENT DOCUMENTS

| | | | |
|---|---|---|---|
| 11,805,726 B1* | 11/2023 | Copeland, Jr. | H04W 4/021 |
| 2011/0099895 A1* | 5/2011 | Berghoff | A01G 7/04 |
| | | | 362/228 |
| 2012/0279121 A1* | 11/2012 | Van Elmpt | A01G 7/02 |
| | | | 47/58.1 LS |
| 2015/0351325 A1* | 12/2015 | Shelor | A01G 7/045 |
| | | | 47/58.1 LS |
| 2016/0341378 A1 | 11/2016 | Donners | |
| 2017/0348506 A1 | 12/2017 | Berman et al. | |
| 2018/0317398 A1* | 11/2018 | Wells | H05B 45/50 |
| 2019/0000020 A1* | 1/2019 | Theisen | A01G 7/045 |
| 2019/0223386 A1* | 7/2019 | Limpert | A01G 7/02 |
| 2021/0307269 A1* | 10/2021 | Massey | A01G 31/06 |
| 2021/0329850 A1* | 10/2021 | Adamson | H05B 45/10 |
| 2023/0064191 A1* | 3/2023 | Pattison | F21S 4/28 |
| 2023/0157217 A1* | 5/2023 | Doyle | A01G 7/045 |
| | | | 47/58.1 LS |
| 2023/0240196 A1 | 8/2023 | Sæther et al. | |

FOREIGN PATENT DOCUMENTS

| | | | | |
|---|---|---|---|---|
| DE | 102004019049 A1 | * | 11/2005 | ............ A01G 20/00 |
| DE | 202013011289 U1 | | 8/2014 | |
| DE | 202015008699 U1 | | 5/2016 | |
| DE | 202019106971 U1 | * | 1/2020 | ............ A01G 20/30 |
| EP | 1269815 A1 | * | 1/2003 | ............ A01B 45/02 |
| EP | 3146834 A1 | | 3/2017 | |
| EP | 3154332 B1 | | 12/2018 | |
| JP | 5017478 B1 | | 9/2012 | |
| JP | 2020022391 A | * | 2/2020 | |
| JP | 2021114909 A | * | 8/2021 | |
| WO | WO-2012147391 A1 | * | 11/2012 | ............ A01G 7/045 |

OTHER PUBLICATIONS

SportsTurf, Sports Field and Facilities Management, May 2016, www.sportsturfonline.com.

Excels in Sports Infrastructure Brochure, Recreational Systems International, Oct. 2020, www.recreationalsystemsint.com.

* cited by examiner

APPARATUS, METHOD, AND SYSTEM FOR IMPROVED TURF OR GRASS GROWTH

This application is a divisional application claiming priority to and benefit of U.S. patent application Ser. No. 17/985,244, filed Nov. 11, 2022, which in turn is related to and claims benefit of U.S. Provisional Application No. 63/287,115, filed Dec. 8, 2021, the entire contents of which are incorporated herein in their entirety.

TECHNICAL FIELD

The disclosure generally relates to improving the growth of grass and/or turf. More specifically, the present invention relates to overcoming challenges specific to growing grass and/or turf (as opposed to e.g., cash crops) in heavily used and/or heavily shaded areas.

BACKGROUND

It is well known that different plants grow better or worse under different lighting conditions. Everything from the type of lighting (e.g., spectra having a high intensity in red versus blue wavelength), amount of lighting (e.g., intensity within the photosynthetically active radiation (PAR) range), length of lighting (e.g., photons in a PAR range on 1 $m^2$/day (daily light integral (DLI))), and so on influences how plants grow. Even the concept of "better" and "worse" is entirely dependent on the purpose behind growth; for example, in one application there may be a drive to increase vegetative growth or increase disease resistance, whereas in other applications there may be a drive to increase flowering or germination—and these drives may, at times, run contrary to one another in what can be provided by lighting. It is an incredibly complex art to supplement plant growth with lighting, and that is nothing to say of the added complexity when supplemental nutrients such as carbon dioxide are considered.

To date, efforts have been directed to those areas of growth considered more profitable or therapeutic—for example, corn and *cannabis*. Historically, grass and/or turf has been overlooked for a number of reasons: it is difficult to grow indoors and transport for outdoor use, there are non-horticultural options (e.g., fake turf), there are a wide range of grass types each with unique needs, and such efforts have not been optimized for grass growth, for example. However, there is a need to repair or otherwise improve grass or turf growth-particularly in sports or other applications where damage occurs regularly, and traditional methods of reseeding may be too slow to produce desirable results.

SUMMARY

Grass and/or turf growth is impacted by a number of factors both above ground and below ground; for example, soil temperature, nutrient levels, water levels, oxygen, humidity, above ground temperature, wind, and as previously described, light.

With respect to just light, there are a host of factors which can impact everything from root depth to disease resistance, and while sunlight and artificial light (e.g., grow lights) can produce swards which are suitable for initial use, shade and/or damage can negatively impact portions of grass/turf for which there are no commercially available solutions. As an example, reseeding—which is commercially available option—is not a viable option in sports applications during an ongoing season because damaged spots cannot be avoided, and a level of play maintained.

It is therefore a principle object, feature, advantage, or aspect of the present disclosure to improve over the state of the art and/or address problems, issues, or deficiencies in the art.

While there are some commercially available grow light systems which can be used outdoors and across an entire sward, these are large truss systems that block any use of the grass/turf when in operation-which is not typically an issue when used to promote wintertime growth, but most certainly is an issue when attempting to use such systems to repair damage in the middle of a sports season or during times of heightened grass/turf use. As such, not only can such mobile-type grow light systems be improved upon, but it is desirable to create permanent-type grow light systems in stadiums, parks, and other environments where there is pre-existing lighting by supplementing such with highly targeted growth-enhanced lighting to promote growth in shaded and/or damaged areas.

Further objects, features, advantages, or aspects of the present disclosure may include one or more of the following: a method of providing supplemental lighting for grass/turf of varying types including optional nutrient delivery; a method for optimizing said supplemental lighting depending upon factors such as type of shade and location of damage; a permanent-type grow light system optimized for grass/turf repair in accordance with the aforementioned, and which may be retrofitted to existing lighting systems; a mobile-type grow light system optimized for grass/turf repair in accordance with the aforementioned which improves upon mobile-type solutions currently available; either of which systems having the potential to extend growth cycles of grass/turf so to extend playable seasons for some sports; and either of which systems having the potential to operate off existing power (if present) or battery power so to maximize off-hour operation and reduce turf downtime.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

The following drawings are illustrative of particular examples of the present disclosure and therefore do not limit the scope of the disclosure. The drawings are not necessarily to scale, though examples can include the scale illustrated, and are intended for use in conjunction with the explanations in the following detailed description wherein like reference characters denote like elements. Examples of the present disclosure will hereinafter be described in conjunction with the appended drawings.

DETAILED DESCRIPTION

Figure 1A:
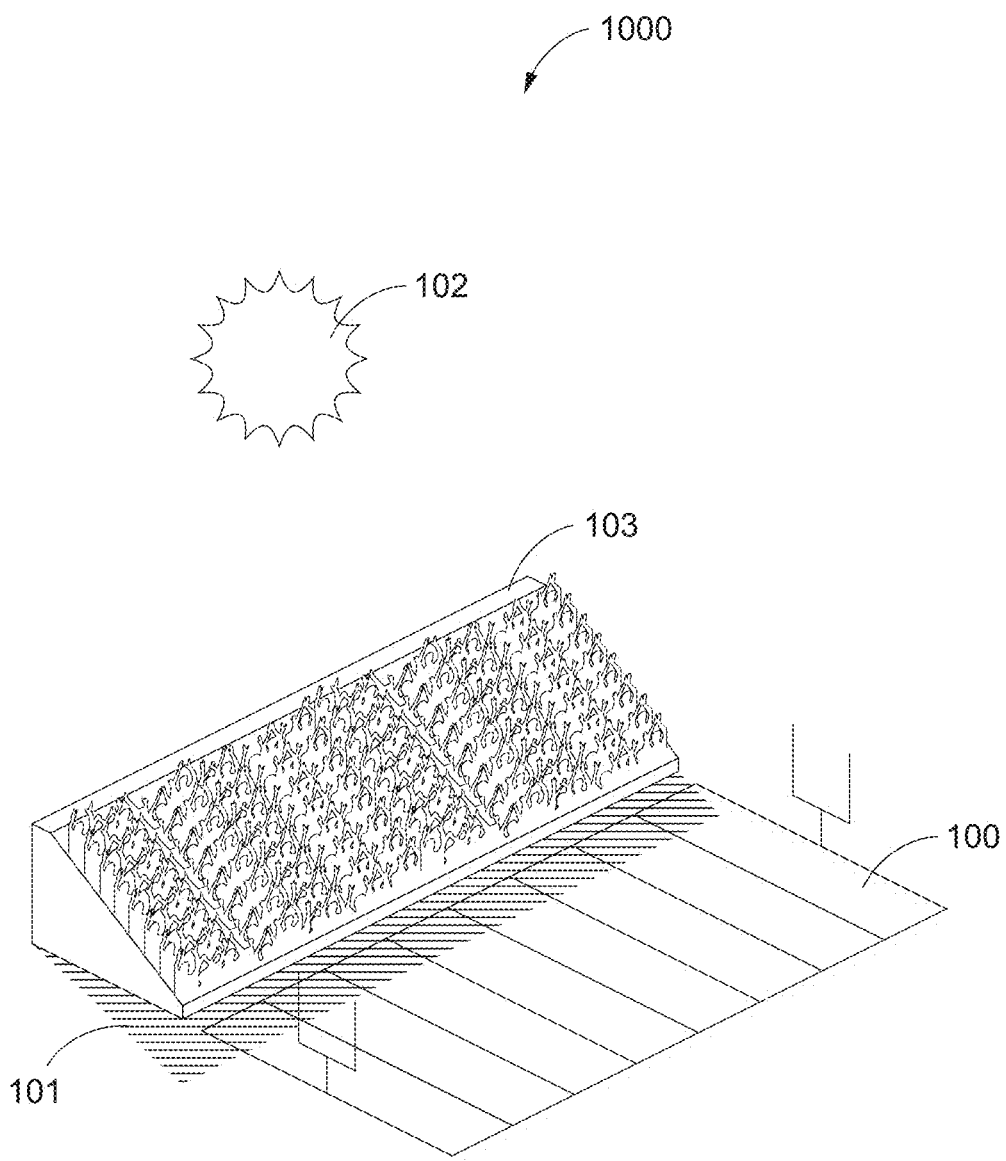
FIG. 1A illustrates a first environment in which aspects of the present disclosure may prove beneficial; here, an outdoor grass/turf at least a portion of which is shaded by a structure (or other construct) which blocks light from a source.

The following detailed description is exemplary in nature and is not intended to limit the scope, applicability, or configuration of the techniques or systems described herein in any way. Rather, the following description provides some practical illustrations for implementing examples of the techniques or systems described herein. Those skilled in the art will recognize that many of the noted examples have a variety of suitable alternatives.

To further an understanding of the present disclosure, specific exemplary embodiments according to the present disclosure will be described in detail. Frequent mention will be made in this description to the drawings. Reference numbers will be used to indicate certain parts in the drawings. Unless otherwise stated, the same reference numbers will be used to indicate the same parts throughout the drawings. Further, similar reference numbers (e.g., 702, 802, 902, 1002, 1102) will be used to indicate similar parts or functionality between embodiments.

Regarding terminology, the term "construct" is used to generically describe either of two possible barriers to providing light to grass and/or turf; specifically, a "structure" which is a generic term intended to comprise any construct which blocks light output/energy from a light source, and a "plant" which filters light output/energy from a light source such that the light actually delivered to the grass/turf is (usually non-preferentially) more intense at particular wavelengths.

Further regarding terminology, the terms "grass" and "turf" are used interchangeably herein for convenience; neither term is intended to purport specific limitations unless directly stated here, and neither term is intended to exclude any particular type of grass. Finally, reference is given herein to "grow lights" as well as "growth-enhanced lighting"; it is important to note that either term may include light sources of a variety of kinds (e.g., LED, sodium) emitting light of a variety of energies/wavelengths (e.g., UV, so-called far red).

Also, in the context of the present disclosure both terms should be interpreted in accordance with the methods described herein to be optimized for grass/turf. That being said, as used herein the term "grow lights" refers to the aforementioned in and of itself, whereas "growth-enhanced lighting" refers to lighting designed to supplement other (often pre-existing) lighting so to achieve the aforementioned. In this sense "grow lights" and "growth-enhanced lighting"-when the latter is coupled with pre-existing/other lighting-achieve the same result; namely, (i) lighting that provides energy and a spectrum similar to the sun, (ii) modified to account for shading or damage, and (iii) optimized specifically for grass/turf (as opposed to, e.g., cash crops).

In addition, terms such as "having", "including", "with", etc. or forms thereof are to be interpreted as being open, not limiting the parts of a structure that may be added to that structure.

As previously stated, efforts to increase horticultural growth have focused on so-called cash crops; very little has been done regarding grass/turf. What is available in the industry does not appear to focus on targeted growth in outdoor applications so to repair turf or supplement deficient lighting (e.g., in heavily shaded areas)—and in any event, not in a manner that can be used without adversely impacting the use of said grass/turf (e.g., due to length of time needed or due to an apparatus blocking turf use). There are a number of outdoor environments which may benefit from aspects of the present disclosure which overcome such issues (e.g., see FIGS. 1A-C).

FIG. 1A illustrates a first environment 1000 in which a light source 102 under most circumstances provides adequate light—adequate being a sufficient DLI for the particular type of grass—for a turf 100. However, in this scenario a construct-here, spectator stands 103—blocks light to a portion of turf 100. This reduces DLI and inhibits growth.

Figure 1B:
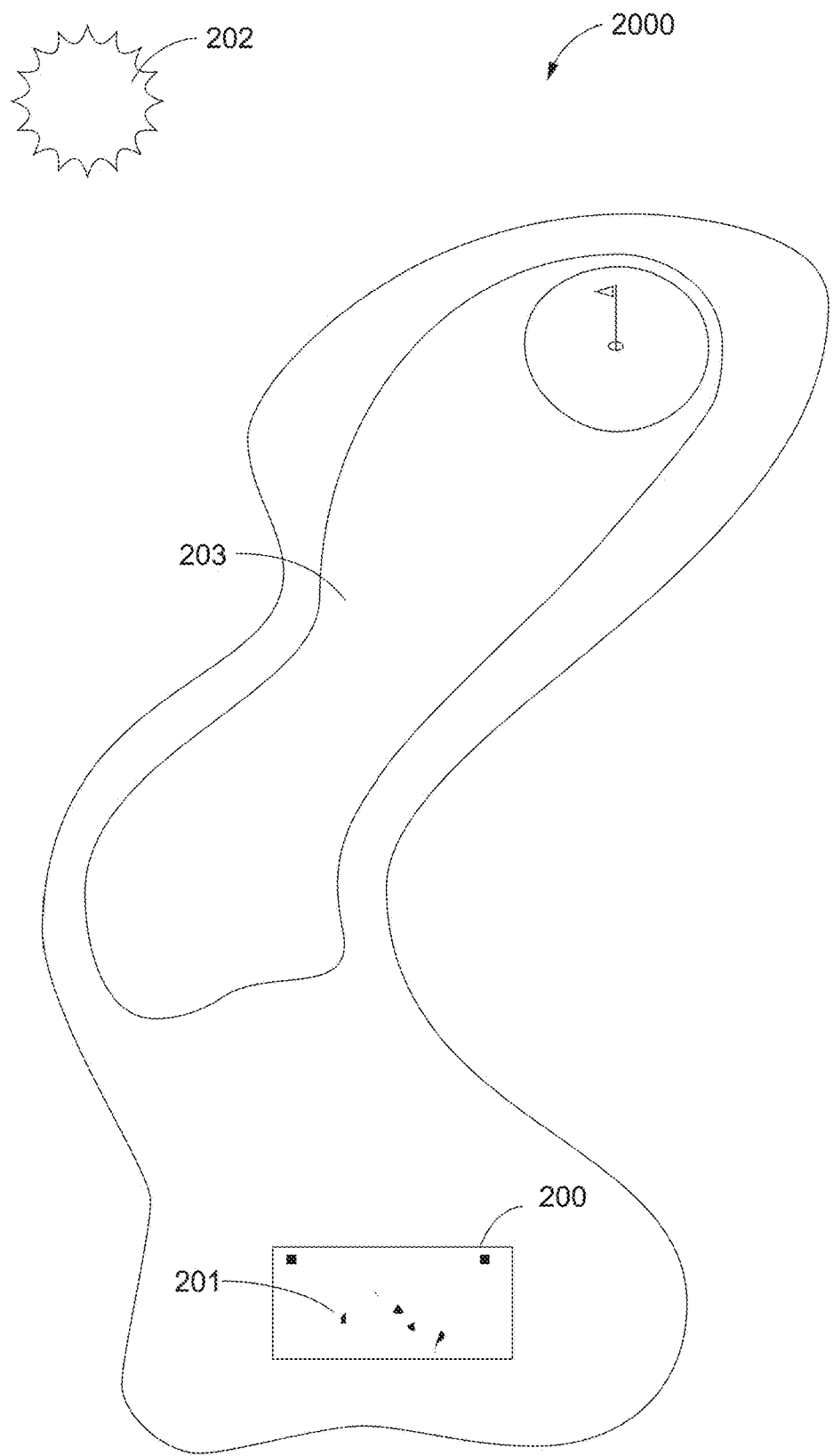
FIG. 1B illustrates a second environment in which aspects of the present disclosure may prove beneficial; here, an outdoor grass/turf at least a portion of which is damaged and there is no blocking of light from a source.

FIG. 1B illustrates a second environment 2000 in which a light source 202 again provides adequate light to turf 203 under most circumstances, however a portion 200 of turf 203 (here, a tee box 200) has damaged spots 201 from use (e.g., divots from tee-off). Note, there are no constructs which block light.

Figure 1C:
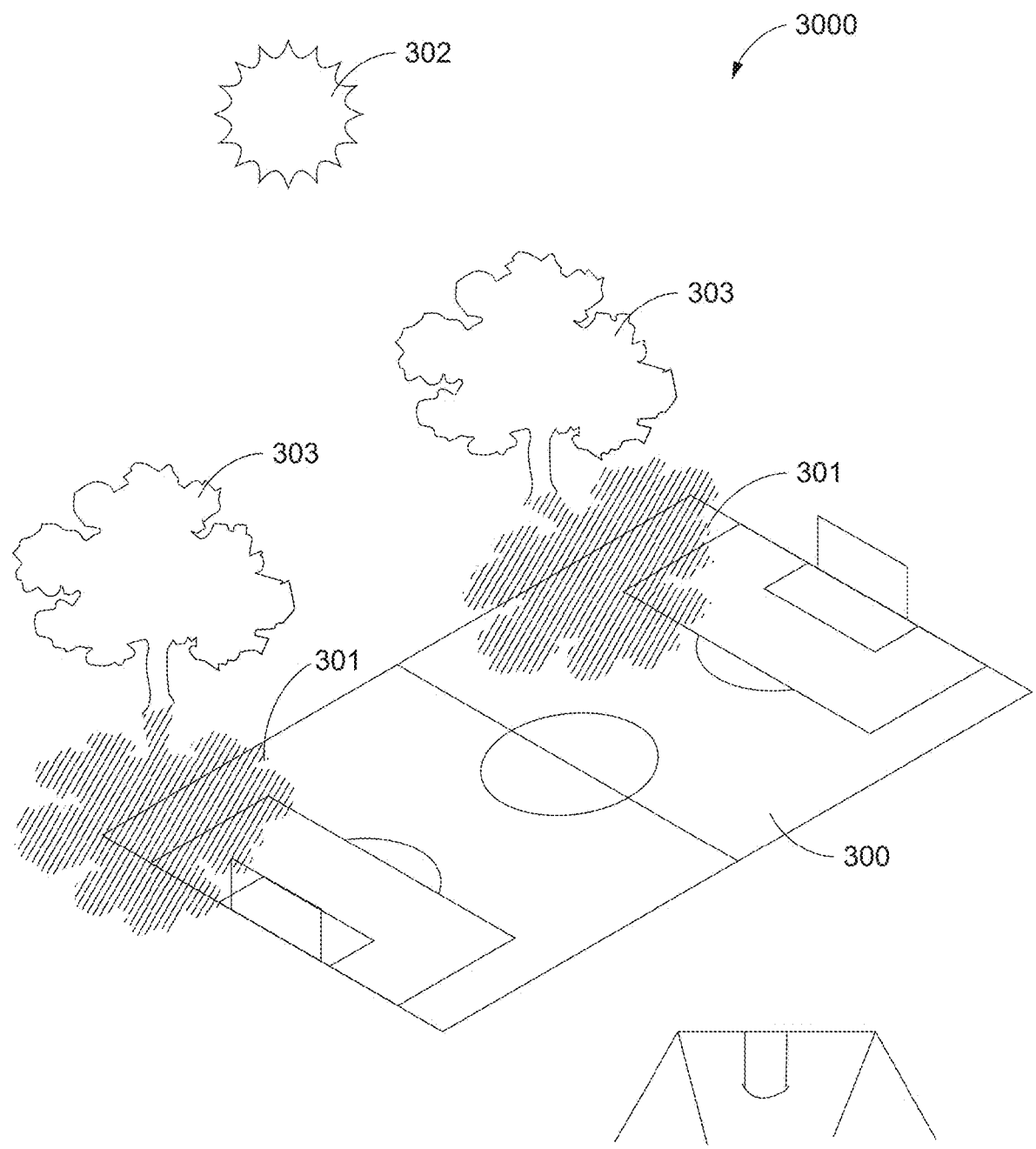
FIG. 1C illustrates a third environment in which aspects of the present disclosure may prove beneficial; here, an outdoor grass/turf at least a portion of which is shaded by a plant (or another construct) which filters light from a source. It is of note some portions of the grass/turf-whether shaded or not—may be damaged (e.g., from excessive or even normal use); this is not illustrated.
Figure 2:
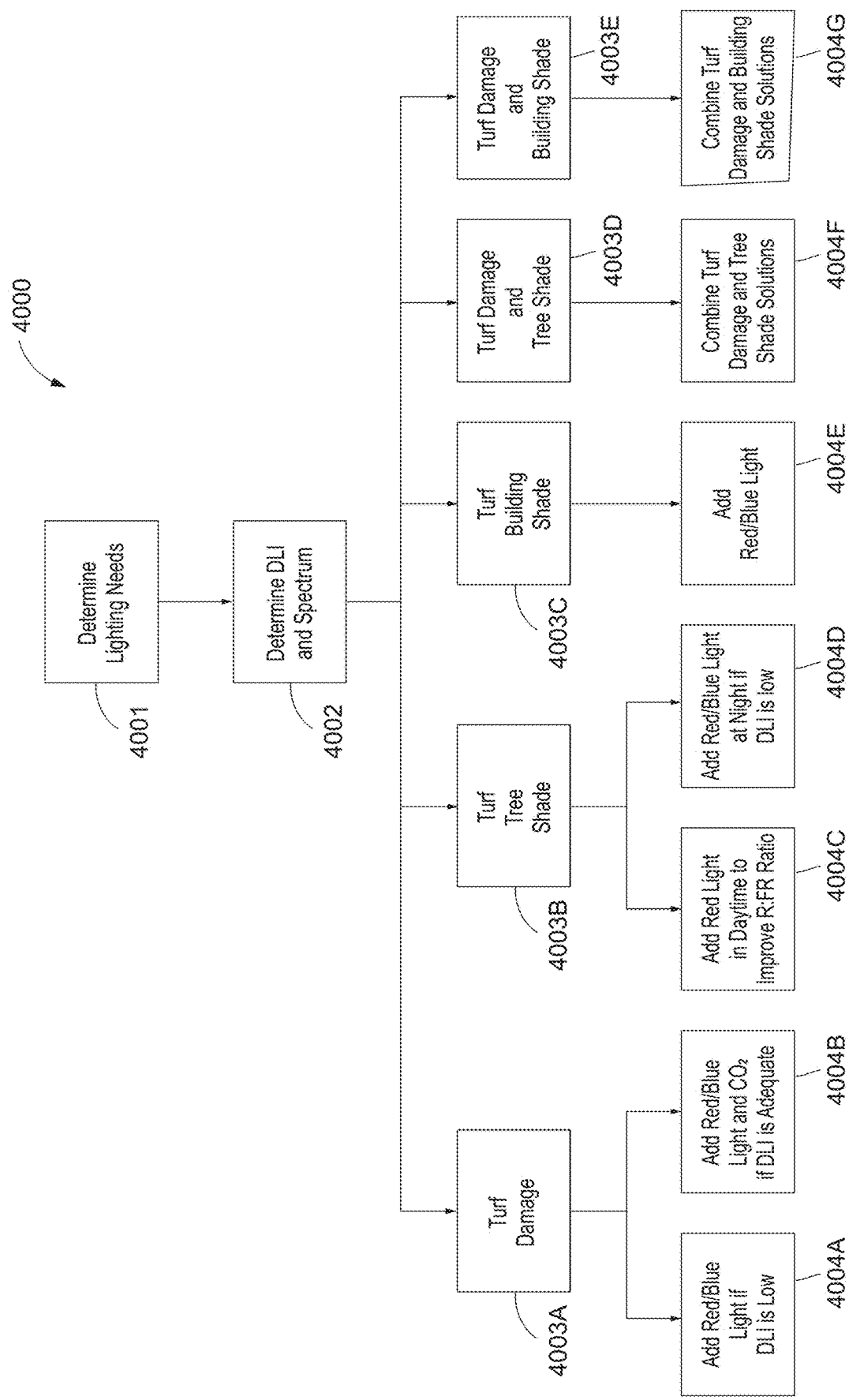
FIG. 2 illustrates a one possible method of practicing aspects according to the present disclosure.

Lastly, FIG. 1C illustrates a third environment 3000 in which a light source 302 again provides adequate light to turf 300 under most conditions, but constructs-here plants 303—shade a portion 301 of turf 300. In this scenario light from source 302 is not blocked at portions 301, but rather is selectively filtered by plants 303. This may result in a low DLI (too low to support growth), but even if of a sufficient DLI, results in light deficient in the red wavelength (e.g., approximately 600-700 nm).

Knowing the sorts of environments encountered, and knowing what is lacking in the art, an exemplary method 4000 flows thusly. According to step 4001, lighting needs of the turf are determined. In practice, step 4001 comprises primarily determining areas of damage and/or shade but may also include such things as identifying the growth zone, type of grass, type of sport or activity, and the like.

For example, if the turf is a soccer field, step 4001 may comprise evaluating grass health around each goal. As another example, if the turf is a golf course, step 4001 may comprise determining the type of grass at the tee box (e.g., where there is likely damage) and determining the type of grass near the rough (e.g., where there may be shade from trees). According to step 4002, DLI and spectrum of existing lighting is determined; again, this could differ for different areas across a sward (e.g., shaded versus non-shaded areas). Depending on whether a motivation is to extend the growth cycle (e.g., in southern states where growth of bermudagrass can be extended several weeks under the right growing conditions), step 4002 might comprise measuring DLI over several periods of time; for example, during different times of day, during different weather conditions (e.g., overcast days), and during different times of the year.

Having the determinations and measurements from steps 4001 and 4002, next steps are dependent upon whether there is turf damage (step 4003A), shade from a construct which filters light (step 4003B), shade from a construct which blocks light (step 4003C), turf damage combined with shade from a construct which filters light (step 4003D), or turf damage combined with shade from a construct which blocks light (step 4003E). Any of steps 4004A-4004G may flow therefrom and may be tailored for each type of grass present.

As can be seen from steps 4004A and 4004B, nutrient delivery (here, carbon dioxide) is dependent upon DLI; if adequate for growth, it may be included (i.e., because $CO_2$ alone is of no benefit to grass growth if there is not sufficient light to supplement it). In practice, $CO_2$ can greatly accelerate growth, which can aid in rapid recovery of damaged areas during a season of use, though there are practical and safety considerations in the delivery of $CO_2$. This is discussed later herein. It is of note that the light delivered according to steps 4004A/B is high in intensity in the red range versus blue (e.g., 3:1 red:blue) and assumes no reseeding has occurred. In practice, if reseeding has occurred, it is possible the inverse is needed (e.g., 1:3 red:blue) before attempting steps 4004A/B.

Steps 4004C and 4004D differ from steps 4004A and 4004B not only because $CO_2$ is not considered, but because one must consider what light is being filtered (e.g., absorbed or reflected) by the construct. Here, plants tend to transmit far red wavelengths (e.g., 700-800 nm) but reflect red wavelengths (600-700 nm) which for many grass types can inadvertently cause dormancy. According to step 4004C, a 1.1:1 red:far red ratio is desired (which may vary based on grass type or other considerations in step 4001). Alternatively, in step 4004D blue light (e.g., 400-500 nm) must be considered if lighting at night (e.g., to minimize turf downtime)—preferably a 3:1 red:blue ratio. Step 4004E is similar to step 4004A, though there is no consideration of receding, and steps 4004F and 10 4004G are combinations of aforementioned steps 4004A-4004E.

Figure 3:
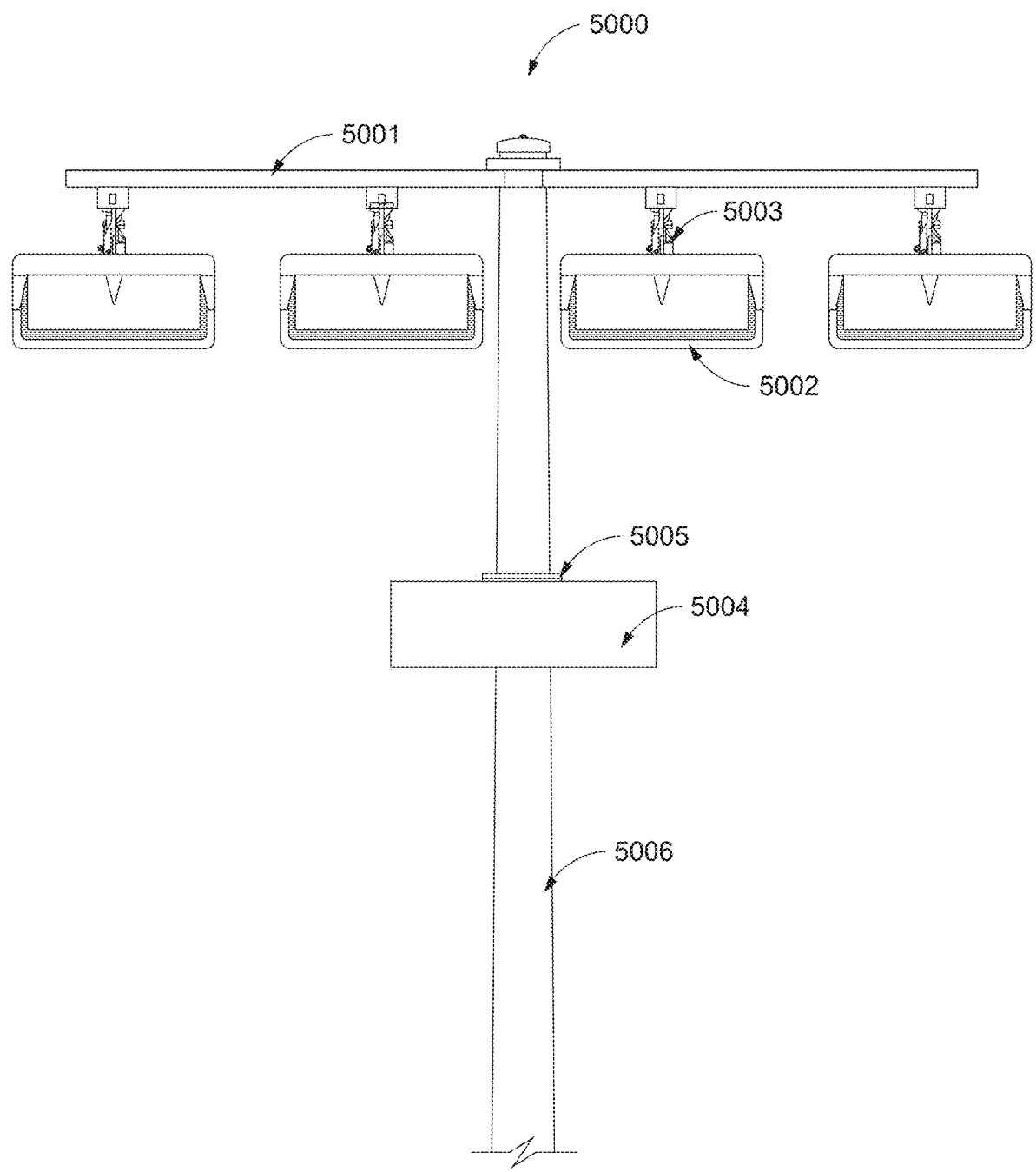
FIG. 3 illustrates a first apparatus according to aspects of the present disclosure designed so to implement the method of FIG. 2 in any of the environments of FIG. 1A-C; here in a permanent installation (which may be a new build or, as illustrated, a retrofit).

A first embodiment designed to deliver the lighting determined in accordance with method 4000 is illustrated in FIG. 3. Here, a grow light system 5000 includes existing lighting fixtures 5002 (e.g., having 75 CRI (color rendering index) at 5700K (Kelvin) color temperature, or perhaps 90 CRI at 4500K color temperature as is common in specialized sports lighting) elevated on a pole assembly 5006, oriented so to generally project light towards a sward via crossarm assembly 5001, one or more individual lighting fixtures adjustable (e.g., via adjustable armature 5003) to provide targeted lighting to a particular swath—in combination with one or more growth—enhanced lighting fixtures 5004 affixed to pole assembly 5006 via a bracketing system 5005.

Here, growth-enhanced lighting fixtures 5004 are lumen-dense (e.g., 100+ LEDs delivering 100 micromoles/$m^2$/s for bermudagrass from a mounting height of 60 feet at a distance of 100 feet), narrow beam (e.g., full width half maximum value of 8-15° beam), and comprise solely red, deep red, or blue LEDs as determined in accordance with method 4000. In this case, models LICU-RED1000000000, LICU-23 DRD1000000000, and LICU-RYL1000000000, respectively, available from Lumileds Holding B. V., San Jose, California, USA, are being used. It is to be understood that this is by way of example and not by way of limitation. If desired, rather than a bracket system 5005, growth-enhanced lighting fixtures 5004 may be affixed to pole assembly 5006 via adjustable armatures 5003 so to facilitate horizontal and vertical aiming, e.g., to allow for adjustment of targeted growth-enhanced lighting as shade moves across the sward during different times.

A benefit of the present embodiment is that because fixtures 5004 are affixed to the same pole assembly 5006 as existing lighting 5002, it is possible said fixtures may operate off the line power (which eliminates the need for a separate power source). Further, since the light sources of fixture 5004 are separate from the light sources of fixtures 5002, fixture 5004 may be operated separately (e.g., at night so to avoid casting a perceivably different color light during sporting events).

Figure 4:
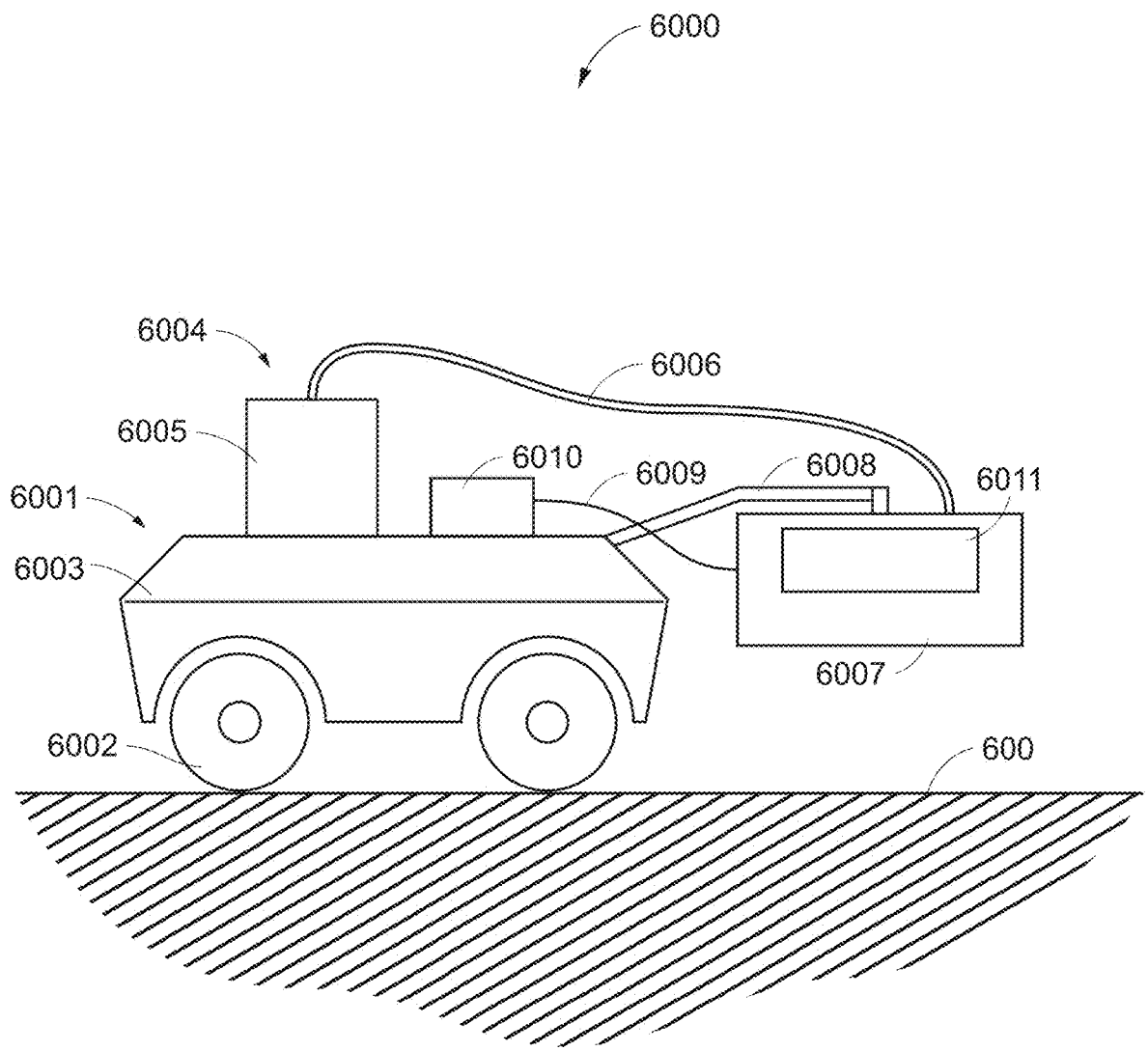
FIG. 4 illustrates a second apparatus according to aspects of the present invention designed so to implement the method of FIG. 2 in any of the environments of FIG. 1A-C; here in a temporary installation (which may be stationary or, as illustrated, mobile).

A second embodiment designed to deliver the lighting determined in accordance with method 4000 is illustrated in FIG. 4. Here a mobile grow light system 6000 includes a grow light fixture 6011—the light sources of which approximate the composite lighting of fixtures 5002 and 5004 of the first embodiment—which is elevated some distance above turf 600 via an armature 6008 and encased by a clear plastic shroud 6007 such that $CO_2$ contained in canister 6005 may be fed via tube 6006 to the space in the interior of shroud 6007 containing fixture 6011.

In this manner, vehicle system 6001—which includes base 6003 to support $CO_2$ delivery system 6004 and wheels or other mobility functionality 6002—may navigate to a damaged portion of turf 600, lower lighting fixture 6011 to a predefined height above the damaged portion, and deliver both lighting and nutrients (here, via battery 6010/electrical means 6009 and canister 6005/tubing 6006, respectively) simultaneously to maximize repair/growth.

A benefit of the present embodiment is that because fixture 6011 can be lowered to just above turf 600, a much lower powered fixture may be used (e.g., 150 watts)—which, for small areas, permits the use of battery power rather than having to pull line power, install a generator, or perform any trenching. Also, a moveable shroud 6007 allows a user to enclose carbon dioxide and deliver it to a precise location-which can better ensure safer use.

As previously discussed, and illustrated herein, exemplary method 4000 is adapted to maximize turf growth and/or repair based on the environment and a number of inputs. For example, soil temperature, nutrient levels, water levels, oxygen, humidity, above ground temperature, wind, and light. And, as previously discussed, "light" includes different requirements based on not only the environment (e.g., when light is blocked versus filtered), but also based on the type of grass.

Figure 5:
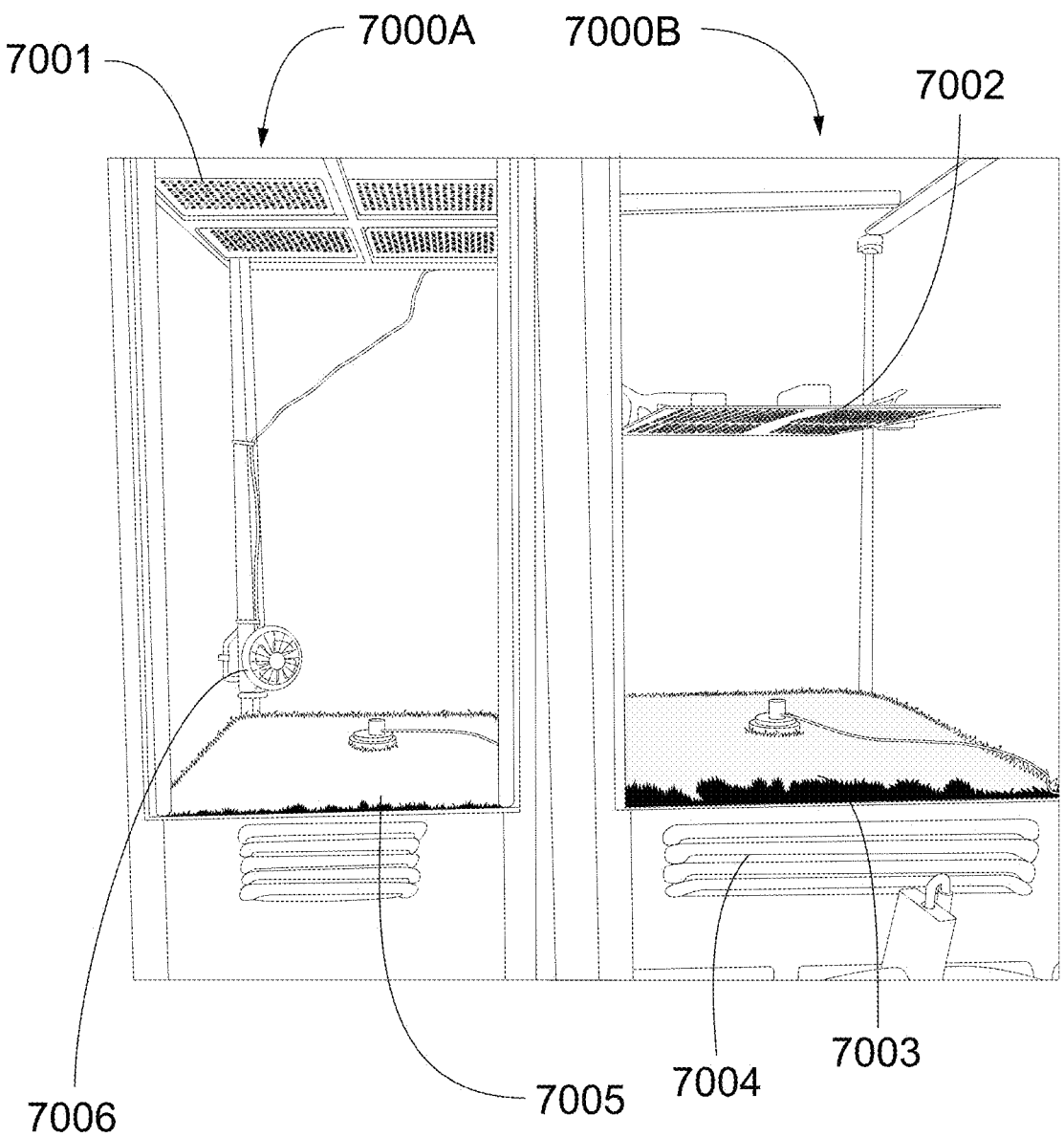
FIG. 5 illustrates an exemplary test setup used to validate the method of FIG. 2 for use in designing the apparatuses of FIGS. 3 and 4.

It is clear, then, that any test setup designed to validate method 4000 and provide the needed inputs in designing fixtures 5002, 5004, and/or 6011 will differ greatly in accordance with the above. One possible test setup is illustrated in FIG. 5. Here, test chamber 7000A employs fixtures 7001 heavy in red/blue spectra (e.g., 3884 mW/$m^2$ 28 at 647 nm/3712 mW/$m^2$ at 459 nm) and test chamber 7000B employs fixtures 7002 designed to mimic sunlight. Both chambers include a bed of bermudagrass 7003 having a soil temperature of roughly 85 degrees Fahrenheit (e.g., as maintained by heating strips 7004 affixed to the chambers and measured by temperature sensors in the soil (e.g., as may be available from Spectrum Technologies, Inc., Aurora, IL, USA).

In this test setup, approximately 45 DLI is provided to each bed 7003 by its respective fixtures 7001, 7002 (e.g., as measured by a PAR/DLI meter available from Apogee Instruments, Inc., Logan, UT, 3 USA). One or more sensors 7005 can measure soil moisture, soil temperature, or potentially other inputs (e.g., via sensors available from Phidgets, Inc., Calgary, Alberta, Canada). Wind can be mimicked via fans 7006 (note there is a fan above and out of the photo for test chamber 7000B), and if desired, wind speed measured.

The foregoing examples are but a few of those contemplated to be within the scope of the present disclosure. To give some sense of some options and alternatives, a few examples are given below.

While an embodiment has been set forth for retrofitting an existing lighting system to provide growth-enhanced lighting, it is important to note that a system such as that described as a first embodiment need not be a retrofit. It could be a new build. In this example, a new build might still include growth-enhanced lighting fixtures 5004 separate from lighting fixtures designed specifically to provide task lighting (e.g., fixtures 5002). As another example, the system described as a second embodiment need not be mobile. It could be a stationary, yet portable, system which could be lifted and set in place.

Likewise, parts associated with the first and second embodiments could be different (or more or fewer) and not depart from aspects according to the present disclosure. As one example, lighting fixture 6011 of the second embodiment could be located outside shroud 6007. As another example, in addition to electrical means to power lighting fixtures of the second embodiment, there may be electrical means to motorize the $CO_2$ delivery system. In this example, there is the potential to use exhaust (e.g., of a generator) as the source of $CO_2$ (and potentially CO, which could also be a useful nutrient for turf growth and/or repair). An additional part—e.g., a catalytic converter-could be included so to make use of a generator safer, and potentially allow for nitrogen and water delivery (which could also be useful for turf growth and/or repair). And, of course, it is possible for both the $CO_2$ delivery system to be motorized and for lighting fixtures to be powered by the same power source.

With regards to the overarching methodology which applies to either of the first or second embodiments, it is important to note that method 4000 may include more, fewer, or different steps than is illustrated and described herein. For example, there may be a step between steps 4001 and 4002 (or before step 4001 or after step 4002) that includes determining the needs of the particular grass type.

Bermudagrass, for example, exhibits dormancy during certain times of the year—perhaps due to light levels or temperature—which may not be readily apparent in a single assessment of lighting needs 4001 or a single measurement of DLI and spectrum 4002. There may be some situations where the specific grass type has needs—aside from assessment of shade and damage common to the entire turf—which may be evaluated in accordance with method 4000. This could add value insomuch that for certain grass types, growth cycles could be adjusted so to extend playable seasons for some sports or could lend itself to a better designed lighting system (e.g., since some turf is actually a combination of grass types). All of the aforementioned are possible, and envisioned.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method of growing grass or turf of varying types comprising:
    determining lighting needs of a sward;
    measuring or otherwise determining an existing DLI and spectrum of light delivered to the sward;
    delivering supplemental lighting to a portion of the sward dependent on determining the lighting needs of the sward and measuring or otherwise determining the existing DLI and spectrum of light delivered to the sward; and
    determining if there is shade on the portion of the sward produced by a construct and determining a wavelength of light absorbed or reflected by the construct producing the shade.

2. The method of claim 1, wherein the supplemental lighting is designed to promote growth of at least one grass type of the sward.

3. The method of claim 1, wherein the step of determining lighting needs of a sward comprises: determining if there is damage to a portion of the sward.

4. The method claim 1, wherein the step of measuring or otherwise determining an existing DLI and spectrum of light to the sward includes measuring DLI over several periods of time.

5. The method of claim 1, further comprising delivering carbon dioxide.

6. The method of claim 1, wherein delivering supplemental lighting includes delivering light that is high in intensity in a red versus blue ratio.

7. The method of claim 1, wherein delivering supplemental lighting includes delivering light that is high in intensity in a blue versus red ratio.

8. The method of claim 1, further comprising reseeding if the sward is damaged.

* * * * *